United States Patent [19]
Witko et al.

[11] Patent Number: 5,562,255
[45] Date of Patent: Oct. 8, 1996

[54] COMBINED PRIMARY AND SECONDARY TIRE SHEARS

[76] Inventors: Zbigniew J. Witko, 441 Archglen Way, San Jose, Calif. 95111; Antonio L. A. Reis, 1950 Birchwood Ct., Tracy, Calif. 95376

[21] Appl. No.: 416,317

[22] Filed: Apr. 4, 1995

[51] Int. Cl.$^6$ .................................................. B02C 18/08
[52] U.S. Cl. ........................ 241/158; 241/236; 241/166; 241/DIG. 31
[58] Field of Search ..................... 241/158, 159, 241/160, 29, DIG. 31, 67, 236, 166, 167, 222, 224, 225

[56] References Cited

U.S. PATENT DOCUMENTS

| | | |
|---|---|---|
| 3,843,064 | 10/1974 | Suzuki ........................................ 241/67 |
| 3,931,935 | 1/1976 | Holman . |
| 3,991,944 | 11/1976 | Baikoff . |
| 4,374,573 | 2/1983 | Rouse et al. . |
| 4,607,800 | 8/1986 | Barclay . |
| 4,682,522 | 7/1987 | Barclay . |
| 4,714,201 | 12/1987 | Rouse et al. . |
| 4,784,251 | 11/1988 | DeWoolfson et al. ............... 241/158 X |
| 4,901,929 | 2/1990 | Barclay . |
| 5,127,588 | 7/1992 | Schmidt . |
| 5,143,307 | 9/1992 | Lundquist ............................ 241/158 X |
| 5,145,120 | 9/1992 | Barclay . |
| 5,411,216 | 5/1995 | O'Keefe ....................... 241/DIG. 31 X |
| 5,452,860 | 9/1995 | Williams ...................... 241/DIG. 31 X |

Primary Examiner—Mark Rosenbaum
Attorney, Agent, or Firm—Thomas Schneck

[57] ABSTRACT

A tire-shearing machine capable of varying the size of tire chunks segmented. A primary shear segments a tire, along a longitudinal axis, into a plurality of longitudinal strips and feeds the strips into a secondary shear. The secondary shear segments, along an axis perpendicular to the longitudinal axis, each of the longitudinal strips into a plurality of chunks. The speed of each of the shears is controlled independently of the other, and on-the-fly, to allow producing tire chunks to a desired size.

20 Claims, 6 Drawing Sheets 5,562,255

COMBINED PRIMARY AND SECONDARY TIRE SHEARS

TECHNICAL FIELD

The present invention pertains to an apparatus for shearing tires into segments.

BACKGROUND ART

The problem of disposing of bulky waste materials is receiving increasing attention as existing land-fills reach capacity and the availability of additional land for waste disposal decreases. Reducing waste, such as tires, in size permits volume densification and reduces the requirements of subsequent processing.

Machines which utilize paired shearing wheels to shred waste material into smaller pieces have been developed. For example, U.S, Pat, Nos, 5,145,120, 4,901,929 and 4,607,800 to Barclay disclose machines in which rotating shearing wheels overlap at the edges of shear members on the wheels to cut into the waste material like giant knives. Other patents teaching this type of machine include U.S. Pat. No. 4,374,573 to Rouse et al., U.S. Pat. No. 3,991,944 to Baikoff and U.S. Pat. No. 3,931,935 to Holman. The aforementioned machines are "primary" shredders in the sense that whole tires may be fed into the machines for shredding. As best seen in the above-cited U.S. Pat. No. 4,901,929 to Barclay, annular hubs are attached to the outside diameter of drive shafts and the shear members are fixed to the hubs. The term "shredder" as used herein means a machine which reduces objects by shearing action.

One problem with the aforementioned shredders is their inability to reduce tires to sufficiently small pieces for use. As a result, it is often necessary to subject each tire to a plurality of sequential shredding steps. Shredders having only one shredding element make this task difficult and time consuming. With a single shredding element, it is necessary to reintroduce the tire segments into the shredder in order to further reduce the size of a shredded tire. This may be seen in U.S. Pat. No. 5,127,588 to Schmidt, where a feeder is provided with tines to force the tire into the teeth of a rotary cutting blade. The tines are spaced apart so that tire pieces exceeding a predetermined size are held in place. In this manner, the feeder may once again force these tire pieces into the cutting blade in order to reduce them to a desired size.

Many shredders, however, include a plurality of shredding elements and are designed to subject a tire to multiple shredding steps once the tire has been placed into it. In U.S. Pat. No. 4,714,201 to Rouse et al., a primary shredder shears a tire into primary pieces. The primary pieces are then fed into a secondary shredder via a conveyor belt, The second shredder produces secondary pieces which are smaller than the primary pieces and are fed into a hopper to sort the pieces according to size.

In U.S. Pat. No. 4,682,522 to Barclay, a tire shredder is disclosed having a plurality of rotary shears to sequentially segment a tire into many pieces. A first rotary shear cuts a tire into three annular segments. Each annular tire segment is then sheared into four arcuate parts by a second and a third rotary interleaving shear.

While the primary waste-reducing machines of the prior art significantly reduce the size of tires and the like, in some applications it is desirable to provide further reduction, while reducing the number of sequential shredding steps. Further, it is desirable to control the size of the scrap material produced from cutting the tires to obviate additional steps of sorting tire pieces according to size.

It is an object, therefore, of the present invention to provide a shredding apparatus capable of reducing the size of tires by producing a plurality of tire segments, while being able to vary the size of the segments produced.

SUMMARY OF THE INVENTION

This object has been achieved by a having a tire-shearing machine with a primary shear that segments a tire, along a longitudinal axis, into a plurality of longitudinal strips and feeding the strips into a secondary shear, placed below the primary shear. Pieces from the primary shear are held between shear members until forced therefrom by a scraper which drives the pieces into the secondary shear. The scaper also positions the pieces so that they are cut properly by the secondary shear. The secondary shear cuts, along an axis perpendicular to the longitudinal axis, each of the longitudinal strips into a plurality of small chunks. To flatten each tire, rollers are positioned above the primary shear. The speeds of each of the shears is controlled independently of the other to allow varying the size of the chunks produced by the second shear.

BEST MODE FOR CARRYING OUT THE INVENTION

Figure 1:
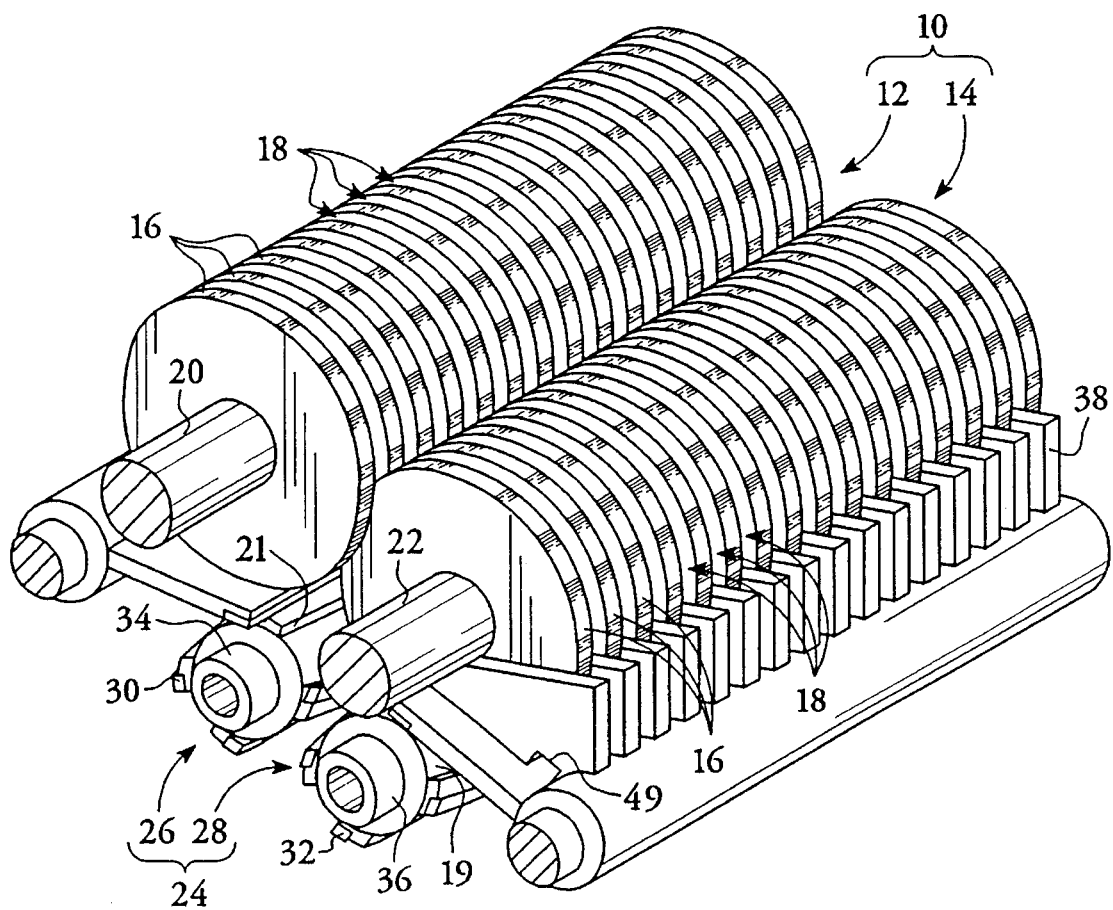
FIG. 1 is a perspective view of a shredding apparatus in accord with the present invention.

FIG. 1 shows a primary rotary shear 10 having first 12 and second 14 sets of annular shear members 16. Each shear member 16 is spaced-apart from adjacent shear members, forming voids 18 therebetween. A first rotatable shaft 20 supports the first shear member set 12 and a second rotatable shaft 22 supports the second shear member set 14. The first 20 and second 22 shafts are spaced apart and parallel so that each of the shear members 16 of the first set 12 are in intermeshing relation with the shear members 16 of the second set 14. That is, excepting one shear member located at an end of each set, each shear member 16 of a set is uniquely associated with, and received into, a void 18 of the remaining set of shear members 16. Positioned adjacent to the first rotary shear 10 is a secondary rotary shear 24. The secondary rotary shear 24 includes first 26 and second 28 sets of helical blades. Each helical blade 30 of the first set 26 is attached to, and spaced axially around, a third shaft 34. Each helical blade 32 of the second set 28 is attached to, and spaced axially around, a fourth shaft 36. The third 34 and fourth 36 shafts are spaced apart and parallel to each other. The axis of rotation of the first 20 and second 22 shafts is parallel to the axis of rotation of the third and fourth shafts. The power source (not shown) used to rotate the primary 10 and secondary 24 shears is discussed more fully below with respect to FIG. 5.

Figure 2:
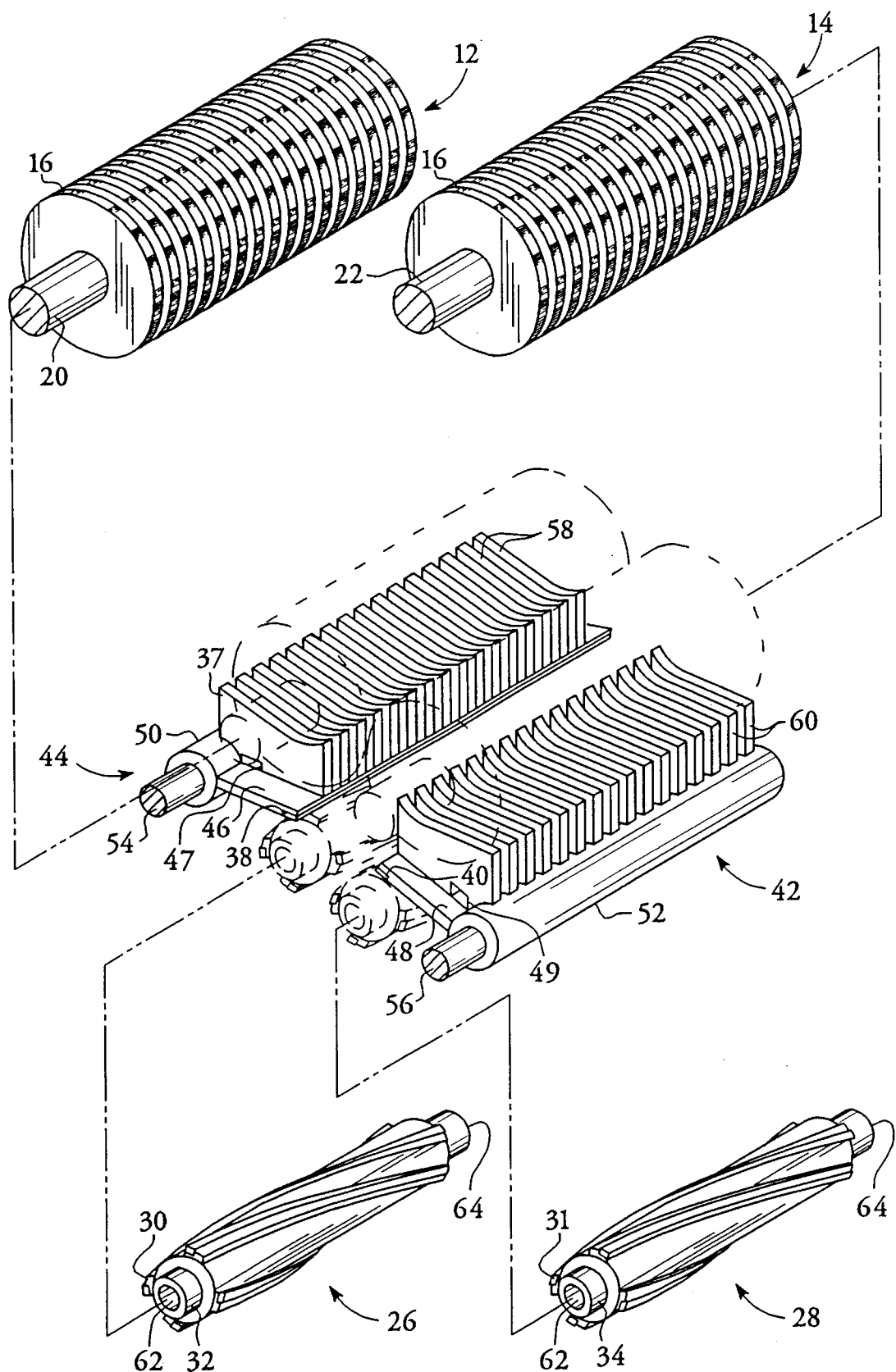
FIG. 2 is an exploded perspective view of the apparatus shown in FIG. 1.

FIG. 2 shows that the first 12 and second 14 sets of the primary shear 10 includes sixteen annular shear members 16, each spaced apart from adjacent shear members. Each shear member 16 is one inch wide and twenty-five inches in diameter. The spacing between each adjacent sheat member 16 should define a void having appropriate dimensions to hold a segmented piece of a tire. Typically, adjacent shear members 16 are spaced apart by one inch. Shafts 20 and 22 are each six inches in diameter. There are four helical blades associated with the first 26 and second 28 sets of the secondary shear 24. Shafts 34 and 36 are each 3.5 inches in diameter. Associated with the first set 26 of helical blades 30 is a first shear blade 38. A second shear blade 40 is associated with the second set 28 of helical blades 32. The first 38 and second 40 shear blades are spaced apart and in opposing relation with respect to one another. Each shear blade is coextensive with the helical blades so that each helical blade shears against a shear blade when rotating adjacent thereto.

Blade holders 42 and 44 each extends rearwardly away from first 38 and second 40 shear blades, respectively. Each blade holder 42 and 44 form a substantially planar rectangular surface 46 and 48, terminating in a cylinder 50 and 52. Cylinder 50 is rotatably attached to mounting shaft 54, and cylinder 52 is rotatably attached to mounting shaft 56. A plurality of first scrapers 58 are attached to planar surface 46, and a plurality of second scrapers 60 are attached to planar surface 48. Each scraper extends away normal to the planar surface so that it is uniquely associated with, and received into, a void 18 of the first rotary shear 10. During the segmentation of tires, tremendous stress is placed on the shear due to friction. The friction creates heat which should be dissipated in order to increase the operational life of the shredder. This is accomplished by flowing a coolant through various components of the shears. To that end, third 34 and fourth 36 shafts may be hollow and include a flow-in 62 and 63, as well as a flow-out 64 and 65 port to allow coolant to flow therethrough. In addition, a conduit 47 may place each of the first scrapers 58 in fluid communication. Similarly, a conduit 49 may place each of the second scrapers 60 in fluid communication. A coolant may also flow through conduits 47 and 49 to dissipate thermal energy. The shafts of the primary shear 10 may also include a means to allow coolant to flow therethrough, if desired.

Figure 3:
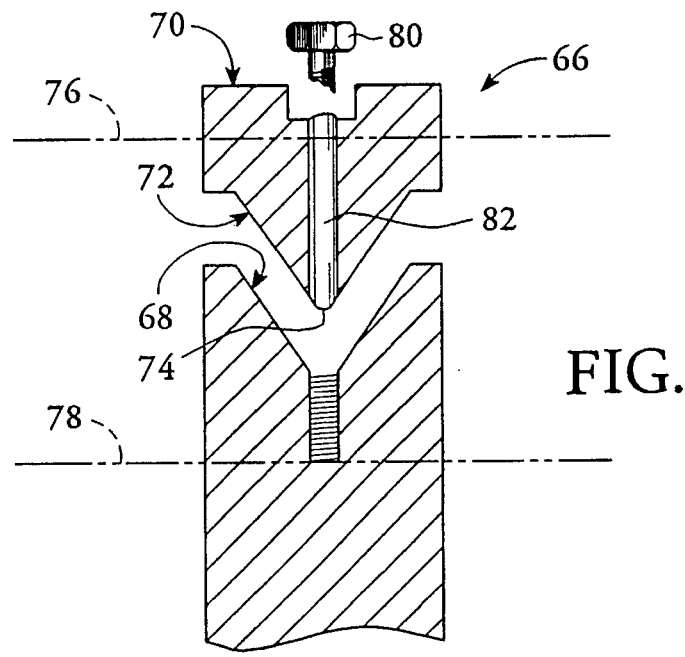
FIG. 3 is a side cross section view showing a cutting blade attached to a shear member of the present invention.
Figure 4:
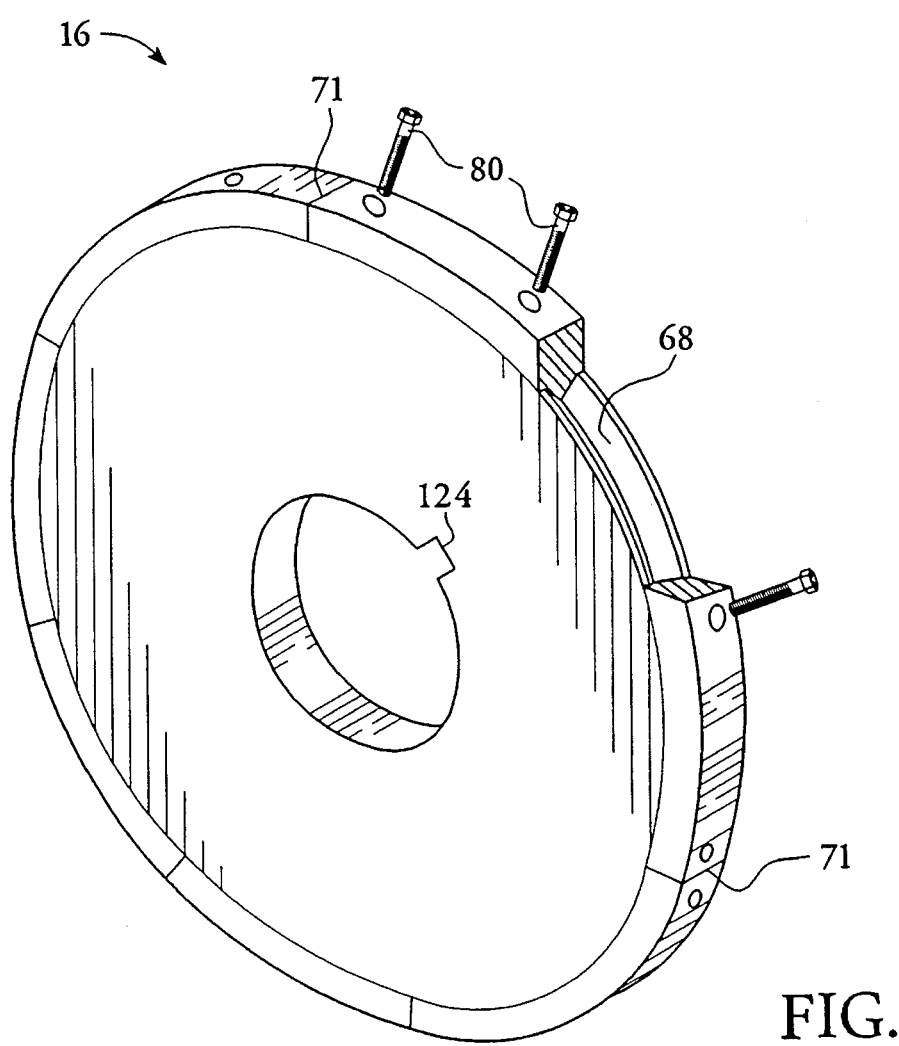
FIG. 4 is a perspective view showing the attachment of the cutting blade shown in FIG. 3A.

Due to the arduous nature of shearing tires, the edges of members 16 wear with use. To overcome the wear, FIGS. 3 and 4 show a plurality of cutting elements 66 attached along a periphery 68 of each shear member 16. Each cutting element 66 includes an outer surface 70 and an inner surface 72. The inner surface 72 includes a V-shaped protrusion extending away from the outer surface 70, ending in a vertex 74. Coextensive with the outer surface 70, the vertex 74 is also centered along a transverse axis 76 of the cutting element 66. The profile of the periphery 68 conforms with the profile of the inner surface 72 so that each cutting member is centered along a shear member 16's transverse axis 78. In this manner, the spacing and alignment between cutting elements 66 of adjacent shear members 16 can be precisely controlled. Each cutting element 66 attaches to the periphery 68 by at least two bolts 80. The cutting elements 66 each includes counter bores 82 allowing the bolt heads to fit flush with the outer surface 70. The spacing between the cutting elements 66 attached to the periphery 68 is de minimis and defines a substantially smooth junction 71 therebetween. Also shown therein is a key way 124 that is present on each shear member 16. Each shaft supporting a shear member includes a surface conforming to the key way 124, to ensure the shear member 16 rotates with the shaft.

Figure 5:
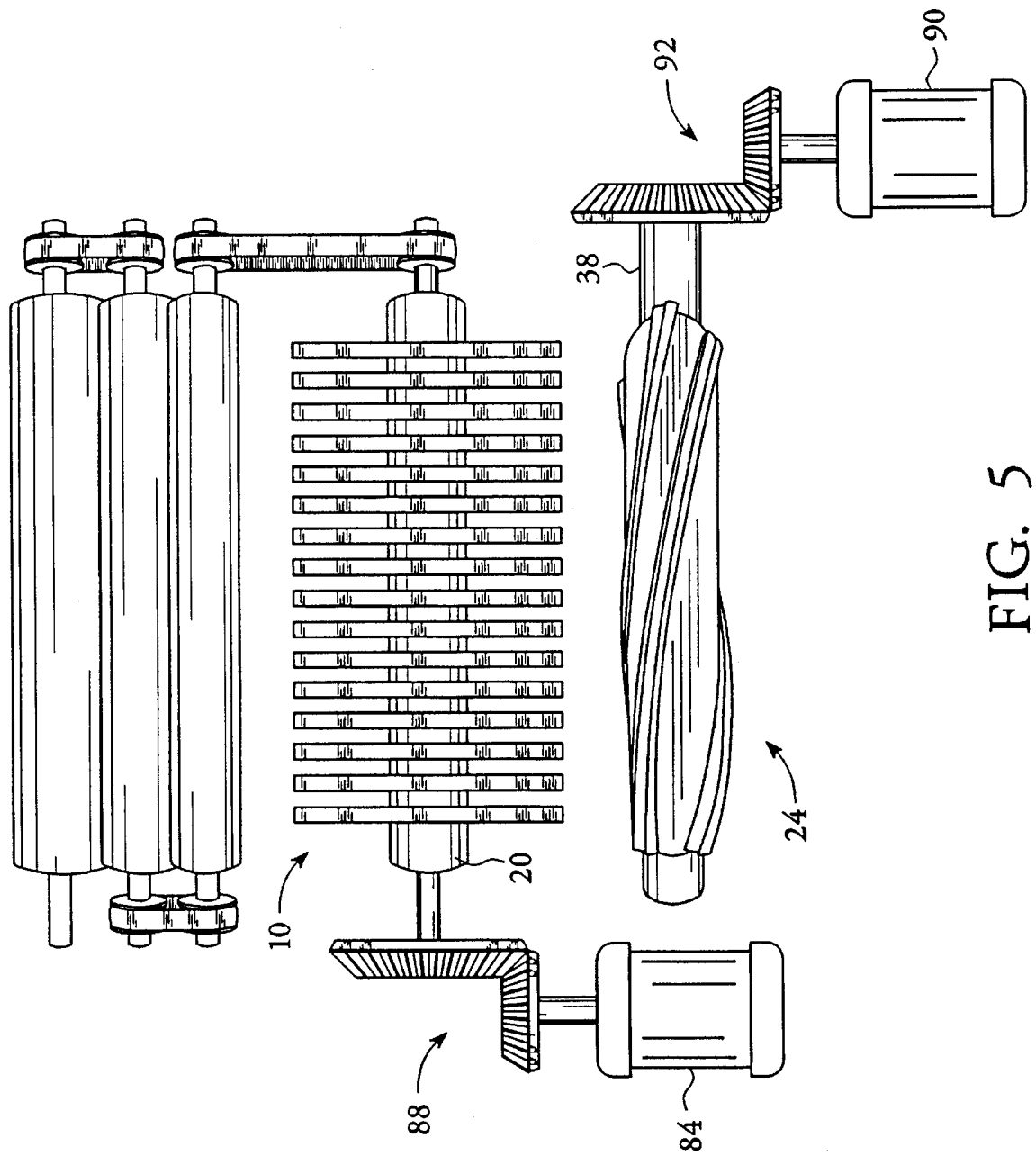
FIG. 5 is a plan view showing the coupling of motors to the invention shown in FIG. 1.

FIG. 5 shows the power source for the rotary shears. Although not necessary, it is preferred to control the speed of the primary 10 and secondary 24 shears, independent of the other. In this manner separate drive systems are used to power each shear, including electric or hydraulic motors. Motor 84 is mechanically coupled to the first 20 and second 22 shafts via reduction gears 88. Motor 90 is mechanically coupled to the third 32 and fourth 34 shafts via reduction gears 92. Although it is preferred to use reduction gears, belts and chains, as well as direct-gear-drive, may also be used to mechanically couple the motors to the shafts. Also, it is possible to use one motor coupled to a transmission that would enable rotating both shears at different speeds, simultaneously.

Figure 6:
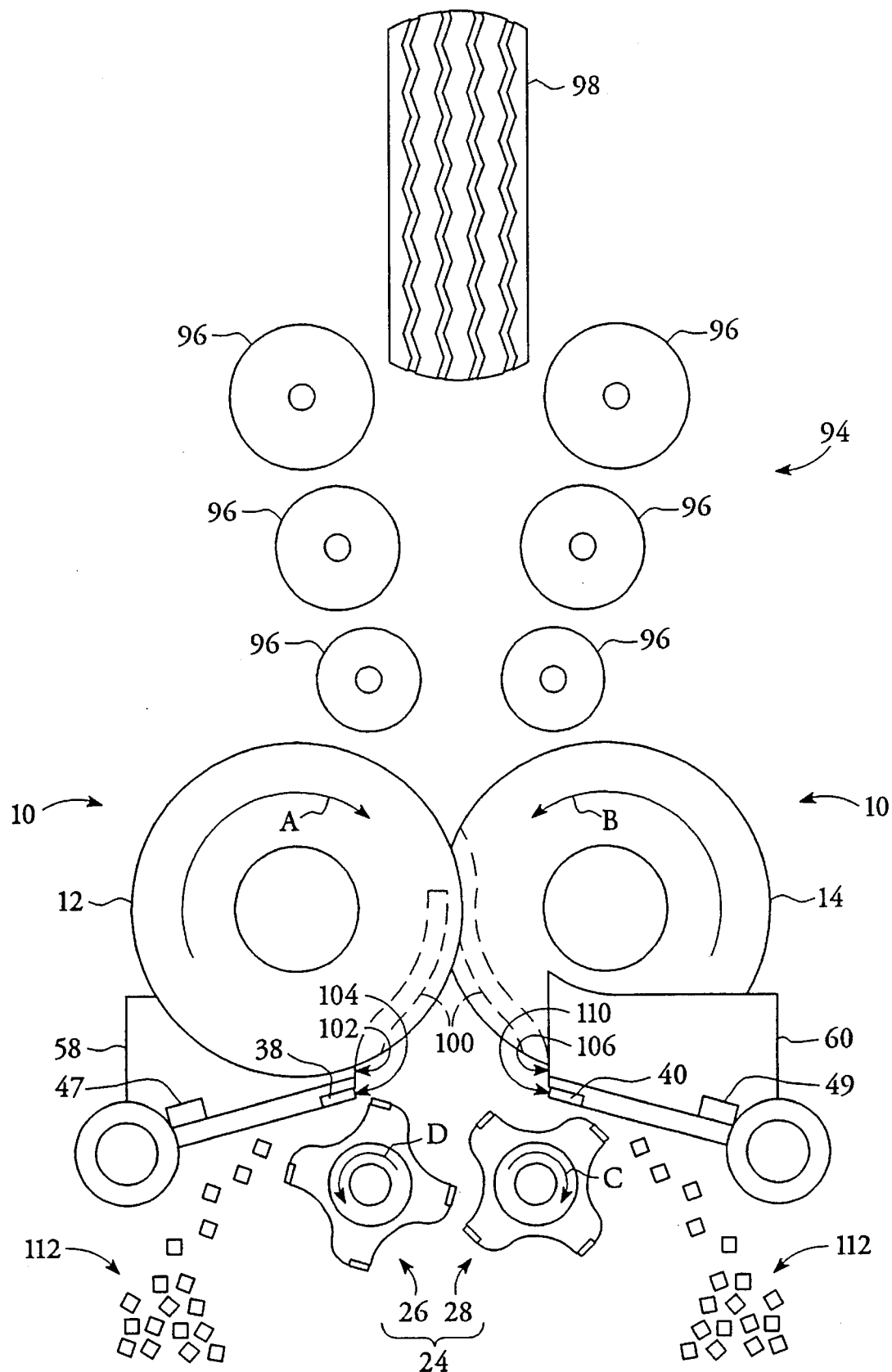
FIG. 6 is a plan view showing the operation of the invention shown in FIG. 1.

FIG. 6 shows a compression assembly 94 including a plurality of rows of compression rollers 96 arranged to form a V-shaped assembly, with the vertex of the "V" positioned proximate to the primary rotary shear 10. Although any number of rows of rollers 96 may be used, it is preferred to have three rows. Although it is not necessary to include a compression assembly to practice the invention, it is preferred to do so in order to flatten the tire before feeding it into the primary rotary shear 10. Any compression assembly may be employed so long as it compresses a tire along the side walls. Although six rollers are shown, any number could be employed, dependent upon the application.

The V-shaped compression assembly 94 grasps any common size tire 98 and advances the tire in an upright position along a first direction toward the first rotary shear 10. As the tire 98 moves through the assembly 94, a compression force is applied to the sidewalls. The flattened tire exits the compression assembly and enters the primary rotary shear 10. The first 12 and second 14 sets of shear members 16 rotate in opposite directions, as indicated by arrows A and B. The counter-rotation of the primary shear 10 grasps the tire 98 and feeds it therethrough into the secondary shear 24. Feeding is accomplished by the entire tire 98 being segmented, along an axis parallel to the first direction, into a plurality of longitudinal strips 100, each of which is wedged into, and held by, a void defined between two shear members. The void is capable of holding a strip 100 because adjacent shear members 14 are spaced apart sufficiently to accomplish this task. As the first 12 and second 14 sets continue to rotate, the strips 100 come into contact with a scraper. Specifically, strips 100 associated with the first set 12 of shear members come into contact with one of the first 58 scrapers, and strips associated with the second set 14 of shear members come into contact with one of the second scrapers 60. Each scraper removes the strip 100 from the void and positions it properly so that the strip is forced into the secondary rotary shear 24 in a manner to allow segmenting the strip into a plurality of chunks.

In order for the scrapers to position the strip 100 properly with respect to the secondary rotary shear 24, the front edge of each scraper and the front edge of each shear blade lie along the same plane. That is, the front edge 102 of the first scrapers 58 and the front edge 104 of shear blade 38 are aligned along the same plane. The front edge 106 of the second scrapers 60 and the front edge 110 of shear blade 40 lie along the same plane. In this configuration, each longitudinal strip 100 traverses the front edge of a scraper to extend between a shear blade and the helical blades. In this manner, the longitudinal strip is further segmented along an axis perpendicular to the first direction, each time a helical blade passes adjacent to a shear blade. This reduces the longitudinal strips 100 into a plurality of chunks 112. The first 26 and second 28 sets of helical blades counter-rotate along directions shown by arrows C and D. By varying the rotational speed of the primary 10 and secondary 14 shears, the shredder may create chunks 112 of a predetermined size. For example, maintaining the rotational velocity of the primary shear constant 10 and increasing the rotational velocity of the secondary shear, would produce smaller chunks 112. Conversely, if the rotational velocity of the primary shear 10 were increased and the rotational velocity of the secondary shear 24 remained constant, larger chunks 112 would be produced.

This would prove advantageous to satisfy customers desiring tire chunks of different sizes. The shredder could produce these different size tire chunks without having to change any parts. In addition, the speed of the shears could be changed on-the-fly adding increased time and efficiency to the segmenting of tires.

Figure 7:
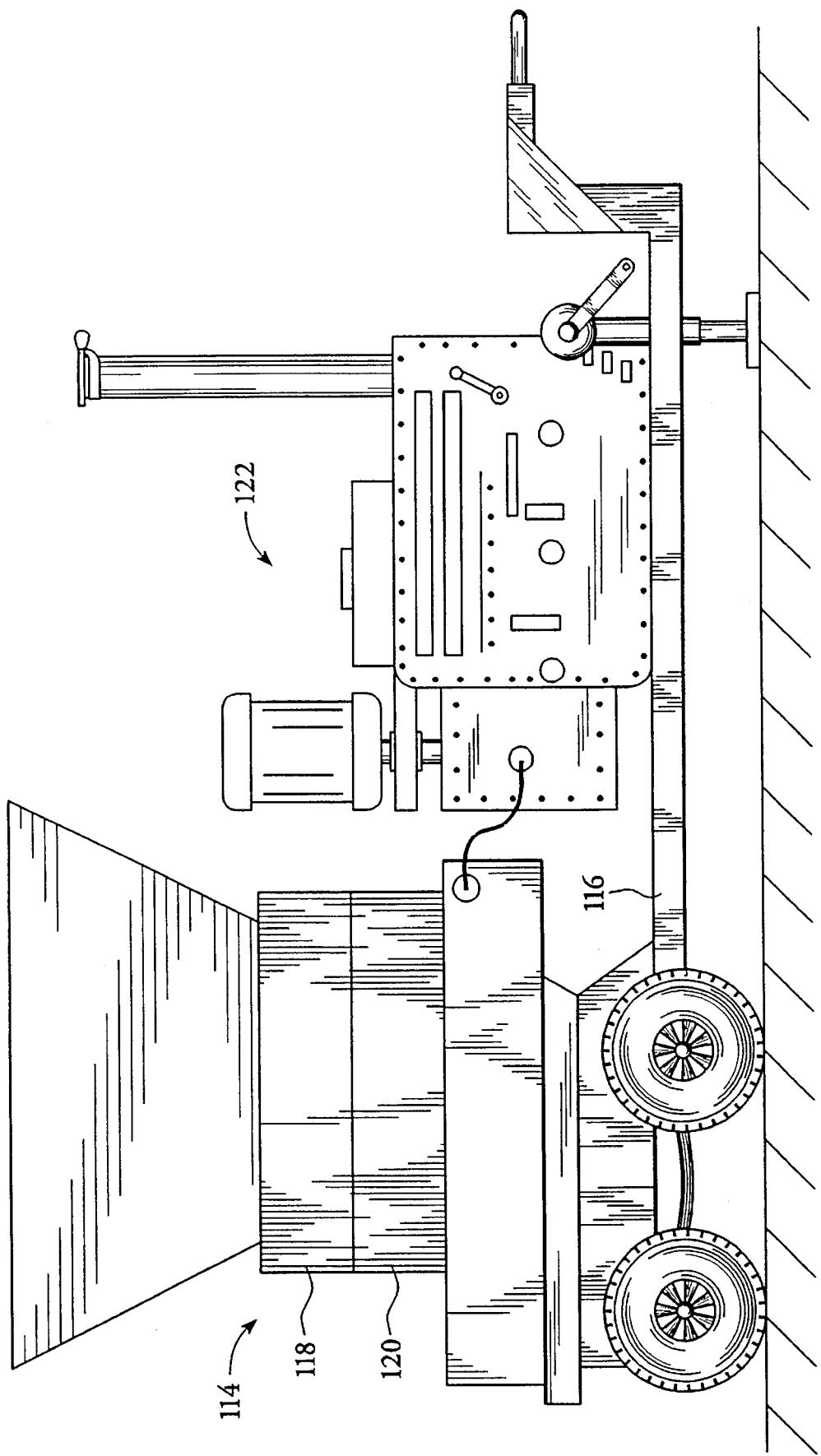
FIG. 7 is a side view of the apparatus shown in FIG. 1 contained within a housing and mounted onto a trailer.

Referring also to FIG. 7, the shredder is enclosed in a housing 114. In the preferred embodiment, the housing 114 is attached to a trailer 116 that includes the electric generator 1122 to power it. The upper portion 118 and the primary shear 10 are removably mounted to the lower portion 120, housing the secondary shear 24 and the first 58 and second 60 scrapers. This allows easy access to the shear blades and helical blades, facilitating maintenance activities, i.e., sharpening of the blades.

We claim:

1. An apparatus for shearing tires, comprising:

first shearing means for segmenting a tire into a plurality of longitudinal strips; and second shearing means for segmenting each of said plurality of longitudinal strips into a plurality of chunks;

a plurality of scrapers disposed between said first and second shearing means, with said first shearing means including means for gripping said plurality of strips, said scrapers adapted to remove said plurality of strips from said gripping means while said first shearing means forces said plurality of strips into said second shearing means to be further segmented into a plurality of chunks.

2. The apparatus as recited in claim 1 wherein said gripping means has first and second sets of annular shear members, with adjacent shear members of said first and second sets being spaced apart, defining a void therebetween, said void having sufficient width to hold one of said plurality of strips therein, each of said plurality of scrapers being uniquely associated with and extending into a void to remove therefrom said one of said plurality of longitudinal strips.

3. The apparatus as recited in claim 2 wherein each of said shear members includes a plurality of removable blades mounted circumferentially thereto to form side cutting regions.

4. The apparatus as recited in claim 1 wherein said first shearing means includes rotary shears and further including means, coupled to said first shearing means, for varying a rotational speed of said first shearing means to control a size of said chunks produced by said second shearing means.

5. The apparatus as recited in claim 1 wherein said second shearing means includes a plurality of helical blades spaced axially around a circumference of a third shaft, and at least one shear blade positioned so that said plurality of helical blades shear against said at least one shear blade as said plurality of helical blades move adjacent thereto as said third shaft rotates, with said apparatus further including a means for varying the size of said plurality of particles formed by adjusting a rotational speed of said third shaft.

6. The apparatus as recited in claim 1 further including a compression means for exerting a flattening force on the sidewalls of a tire to flatten it, said compression means positioned above said first shearing means to feed said flatten tire therein.

7. The apparatus as recited in claim 6 wherein said compression means includes an assembly having a plurality of parallel roller shafts aligned in a V-shaped configuration, each roller shaft having a plurality of coaxial compression rollers, forming a funnel-like conveyor to said first shearing means.

8. The apparatus as recited in claim 1 wherein said first and second shearing means each includes a motor means in power transfer relation to each of said shearing means and said compression means for enabling shearing of said tires.

9. An apparatus for shearing tires, comprising:

first shearing means for segmenting a tire into a plurality of longitudinal strips; and second shearing means for segmenting each of said plurality of longitudinal strips into a plurality of particles, with said first shearing means feeding said plurality of strips into said second shearing means, said first shearing means including rotary shears and said second shearing means including a plurality of helical blades spaced axially around a circumference of a third shaft, and at least one shear blade positioned so that said plurality of helical blades shear against said at least one shear blade as said plurality of helical blades move adjacent thereto as said third shaft rotates.

10. The apparatus as recited in claim 9 wherein said third and fourth shafts are hollow and each have opposed ends, with a material inflow port at one end and a material outflow port at an opposite end to receive a coolant therethrough.

11. The apparatus as recited in claim 9 wherein said first shearing means includes means for gripping said plurality of strips while forcing said plurality of strips into said second shearing means to be further segmented into a plurality of chunks.

12. The apparatus as recited in claim 11 wherein said gripping means has first and second sets of annular shear members, with adjacent shear members of said first and second sets set being spaced apart, defining a void therebetween, said void having sufficient width to hold one of said plurality of strips therein, and a plurality of scrapers, each of which is uniquely associated with and extending into said void to remove said one of said plurality of longitudinal strips therefrom.

13. An apparatus for reducing tires to relatively small particles, comprising:

first means for shearing a flattened tire into a plurality of parallel segments, with said segments being parallel to a first axis, said first shearing means including rotary shears disposed to rotate about an axis;

second means, positioned to receive said plurality of parallel segments, for shearing each of said plurality of parallel segments along a second axis, forming a plurality of particles, said second axis being perpendicular to said first axis;

means, coupled to said first shearing means, for varying the size of said plurality of particles formed by said second shearing means by adjusting a rotational speed of said first shearing means; and a plurality of scrapers disposed between said first and second shearing means, with said first shearing means including means for gripping said plurality of strips, said scrapers adapted to remove said plurality of strips from said gripping means while said first shearing means forces said plurality of strips into said second shearing means to be further segmented into said plurality of particles.

14. The apparatus of claim 13 wherein said first shearing means has first and second sets of annular shear members, each of said annular shear members of said first and second sets being spaced apart from adjacent shear members, defining a channel, said gripping means including said channel with said channel being adapted to grip said one of said plurality of parallel segments while said shearing means forces said plurality of segments into said second shearing means, with a plurality of said shear members of said first set supported by a first rotatable shaft and received into a channel defined by said second set of shear members with said shear members of said second set being supported by a second rotatable shaft, parallel to said first shaft, and received into said channel defined by said first set of shear members, wherein a cutting region is formed along opposed edges of each shear member.

15. The apparatus as recited in claim 14 wherein said first shearing means includes a plurality of scrapers attached to said second shearing means, each of said plurality of scrapers uniquely associated with and extending into said channel to remove said one of said plurality of parallel segments therefrom.

16. The apparatus as recited in claim 14 further include a motor means in power transfer relation to each of said shearing means, with the motor means including a first motor connected to rotate said first and second shafts of said first shear means and a second motor connected to rotate said at least one shaft of said second shear means, said varying means including a means for adjusting the speeds of said first and second motors independent of the other.

17. The apparatus as recited in claim 14 wherein each of said shear members includes a plurality of removable blades mounted circumferentially thereto to form side cutting regions, each of said plurality of blades associated with each shear member abutting one another forming a substantially planar surface along the circumference of each of said shear members.

18. The apparatus as recited in claim 13 wherein said second shearing means includes a plurality of helical blades spaced axially around a circumference of at least one shaft, and at least one shear blade positioned so that said plurality of helical blades shear against said at least one shear blade as said plurality of helical blades move adjacent thereto as said at least one shaft rotates.

19. The apparatus as recited in claim 18 further including a compression means for exerting a flattening force on the sidewalls of a tire to flatten it, said compression means positioned above said first shearing means to feed said flatten tire therein, and wherein said scrapers include a means for cooling.

20. The apparatus as recited in claim 19 wherein said at least one shaft is hollow and has opposed ends, with a material inflow port at one end and a material outflow port at an opposite end to receive a coolant therethrough.

* * * * *